United States Patent [19]

Bobry

[11] Patent Number: 5,010,469
[45] Date of Patent: Apr. 23, 1991

[54] UNINTERRUPTIBLE POWER SUPPLY WITH DUAL LEVEL VOLTAGE INPUT

[75] Inventor: Howard H. Bobry, Lynnwood, Wash.

[73] Assignee: Albar, Lynnwood, Wash.

[21] Appl. No.: 521,236

[22] Filed: May 9, 1990

[51] Int. Cl.⁵ .................................. H02M 3/335
[52] U.S. Cl. .................................. 363/37; 363/17; 363/98; 363/132; 307/46; 307/66; 307/87
[58] Field of Search .............. 363/17, 37, 56, 65, 363/98, 132, 133, 134; 307/44–46, 66, 82, 85–87

[56] References Cited

U.S. PATENT DOCUMENTS 4,926,084 5/1990 Furutsu et al. .................. 310/316
4,952,834 8/1990 Okada .............................. 310/316
4,954,741 9/1990 Furutsu et al. .................. 310/316

Primary Examiner—Peter S. Wong
Attorney, Agent, or Firm—Pearne, Gordon, McCoy & Granger

[57] ABSTRACT

An uninterruptible power supply is disclosed having an inverter that operates on either high voltage d.c. supplied by a line-powered power supply or on low voltage d.c. batteries. With line power, the inverter operates as an H-bridge inverter. With battery power, the battery voltage is applied to a smaller portion of the inverter's transformer primary. The changeover from line to battery power is determined by when an intermediate voltage tapped from the transformer drops below the battery voltage.

7 Claims, 2 Drawing Sheets

UNINTERRUPTIBLE POWER SUPPLY WITH DUAL LEVEL VOLTAGE INPUT

BACKGROUND OF THE INVENTION

The present invention relates to a standby a.c. power supply having an inverter that will operate from either of two levels of d.c. voltage.

Uninterruptible power systems, or UPS, are available which are based on several different topologies.

For the most sensitive loads, the full time inverter or "true UPS" approach is best. In this topology, an inverter supplies a.c. to the load on a continuous basis. When the a.c. power line is available, the d.c. power required by the inverter is supplied from the a.c. line (via rectifier/battery charger). When the a.c. line is not available, the d.c. power required by the inverter is supplied by batteries. These batteries are recharged by the rectifier/charger when the a.c. line is again available. Since the inverter always supplies power to the load, there is absolutely no interruption or disturbance of the a.c. output when the power line fails or returns.

The disadvantages to this approach are cost and efficiency. Normally, all of the power required by the load goes through two power conversions: from a.c. to d.c. (via rectifier/charger) and then from d.c. back to a.c. (via the inverter). The advantage is that there is absolutely no disturbance in the output, and the output frequency is independent of the input. This is a particular advantage where the load is frequency sensitive and the input power is unstable (as in some third world countries or when operating off of an emergency generator or other such source). This also allows the UPS to be used as a frequency converter, such as when a 60 Hz load is to be operated on a 50 Hz power system. Also, no switching is required to disconnect the input to the UPS from the failed line, as there is no possibility of the inverter feeding power back to the input.

One of the reasons for poor efficiency in the true UPS in smaller sizes is the use of low voltage batteries. In a small system, the battery voltage will generally be in the 12 to 36 volt range. This is true for primarily economic reasons. Batteries are made up of individual cells, connected in series. A typical lead acid battery cell has a nominal voltage of 2 volts, thus a 12 volt battery has six cells, a 24 volts battery has 12 cells, and so on. For a given amount of energy storage, one can use relatively few large cells (low voltage, high current), or a greater quantity of smaller cells (higher voltage, lower current). At the relatively low power levels of interest here, the use of relatively fewer, larger cells is much less expensive than large number of smaller cells. Unfortunately, power conversion at low voltage and high current is much less efficient than power conversion at higher voltage and lower current. Semiconductor conduction losses of 1.0 volt, for example, are very significant on a 12 volt system, but much less so on a 250 volt system.

From the UPS designer's viewpoint, it is desireable to use a d.c. voltage in the 100-200 volt range. From a cost viewpoint, this is not practical in small systems because of the cost of the batteries.

SUMMARY OF THE INVENTION

The object of the present invention is to provide means for a UPS to operate at a high d.c. voltage, while using low voltage batteries. By way of explanation, it should be noted that the UPS is operated from the a.c. line at almost all times. Battery power is used only when the a.c. line is unavailable, and even in areas where power reliability is very poor, the line is available at least 99% of the time (a full hour of power failures each week would still be 99.4% availability). It is, therefore, the efficiency of the system in line mode which is of concern; efficiency in inverter mode is of little importance.

The UPS topology disclosed herein has an inverter which operates at two different d.c. voltages: A high voltage in line mode, and a low voltage in battery mode.

The inverter includes a transformer having a primary winding and a secondary winding, the primary winding being divided into at least three portions.

It also includes a first d.c. source applied alternately across a first less than all portions of the primary winding and then across a second less than all portions of the primary winding, the first and second less than all portions having a common portion.

In addition, it includes a second d.c. source applied alternatingly across at least a portion of the common portion when the first d.c. source is less than a predetermined voltage. As a result, the secondary winding is maintained at a relatively constant a.c. voltage.

The second d.c. source may be applied alternatingly across the at least a portion of the common portion in a center-tapped inverter configuration, the at least a portion of the common portion having a center tap.

The predetermined voltage is determined by when a voltage at the center-tap drops below that of the second d.c. source.

Alternatively, the second d.c. source may be applied alternatingly across the at least a portion of the common portion in an H-bridge inverter configuration, the at least a portion of the common portion having a voltage at each end thereof.

In this case, the predetermined voltage is determined by when both end voltages drop below that of the second d.c. source.

DESCRIPTION OF THE PREFERRED EMBODIMENTS

Figure 1:
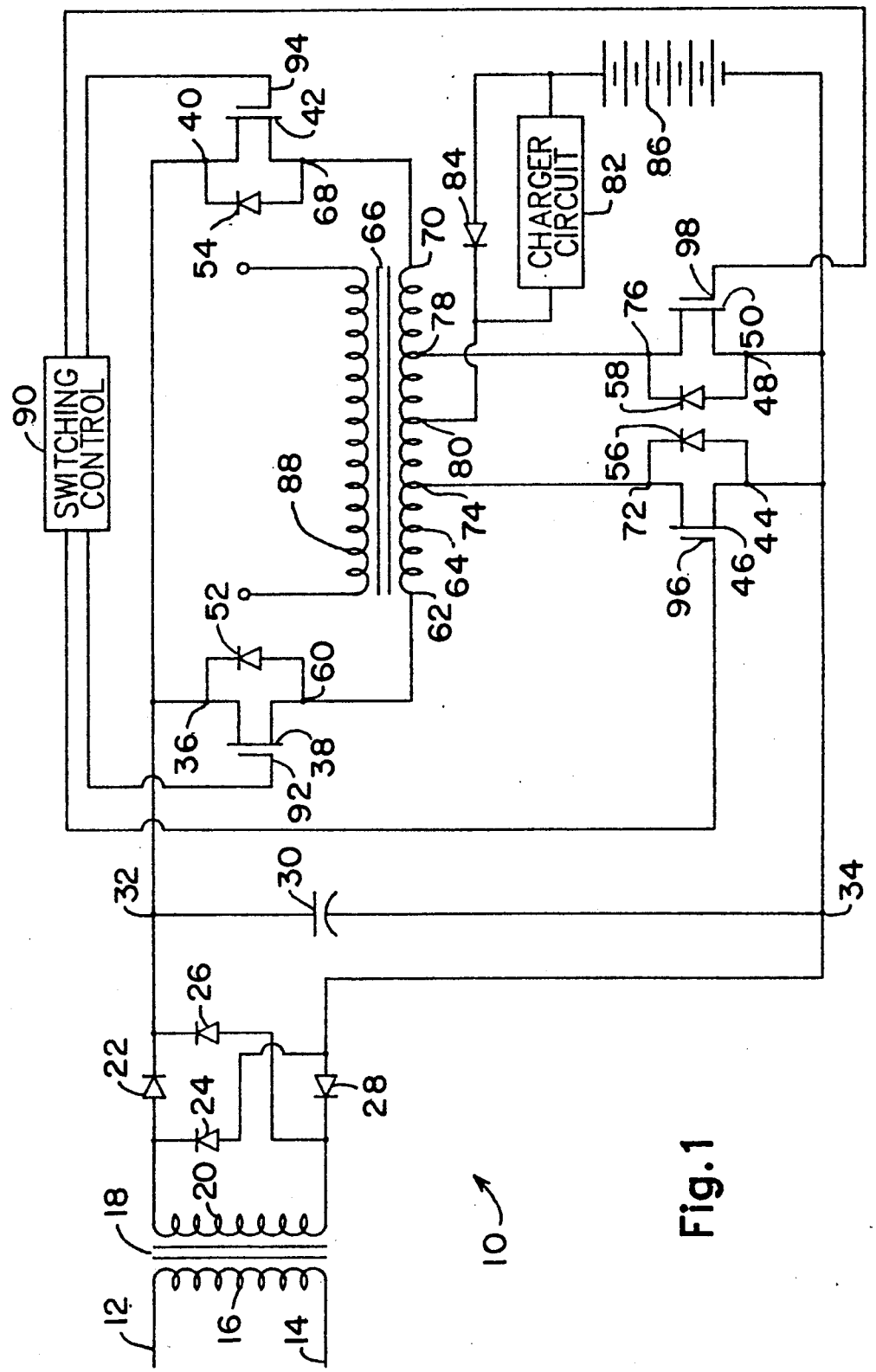
FIG. 1 is a schematic diagram of an uninterruptible power supply according to the invention.

Referring to FIG. 1, an uninterruptible power supply according to the invention is generally indicated by the numeral 10.

An a.c. line 12, 14 is normally connected to the primary winding 16 of a transformer 18. The secondary winding 20 is connected to the bridge diodes 22, 24, 26, 28 which are connected in a full-wave bridge rectifier configuration. The capacitor 30 is connected across the d.c. output terminals 32, 34 of the bridge diodes 22, 24, 26, 28.

In operation, a d.c. voltage appears at the terminals 32, 34 when the a.c. line 12, 14 is energized. It is of course possible to substitute other d.c. sources at the terminals 32, 34. It should be noted that the value of this d.c. voltage can be made as high as desired for efficient inverter operation. For example, a voltage within the range of 100-200 volts has been found to offer significant efficiency advantages.

The terminal 32 is connected to the terminal 36 of the switching element 38 and to the terminal 40 of the switching element 42. The terminal 34 is connected to the terminal 44 of the switching element 46 and to the terminal 48 of the switching element 50.

The switching elements 38, 42, 46, 50 may be, for example, field-effect transistors as shown, or bipolar transistors, or SCRs. The diodes 52, 54, 56, 58 are connected in inverse parallel with the switching elements 38, 42, 46, 50, respectively. In the case of field-effect transistors the diode is integral with the transistor. If other types of switching elements are used, a separate diode is used.

The terminal 60 of the switching element 38 is connected to the end tap 62 of the primary winding 64 of a transformer 66. The terminal 68 of the switching element 42 is connected to the end tap 70 of the primary winding 64.

The terminal 72 of the switching element 46 is connected to the intermediate tap 74 of the primary winding 64. The terminal 76 of the switching element 50 is connected to the intermediate tap 78 of the primary winding 64.

The center tap 80 of the primary winding 64 is connected to the input of a charger circuit 82 and to the cathode of a diode 84. The output of the charger circuit 82 and the anode of the diode 84 are connected to the anode of a battery 86. The cathode of the battery 86 is connected to the d.c. output terminal 34. The battery 86 may be, for example, a 12-volt rechargeable battery.

The transformer 66 is provided with a secondary winding 88. Where good regulation and sinusoidal output is important, the transformer 66 would be a ferroresonant transformer, otherwise a conventional isolation transformer is adequate.

A switching control 90 provides switching control signals to the control inputs 92, 94, 96, 98 of switching elements 38, 42, 46, 50, respectively.

Normally, the power supply 10 operates as a straight forward H-bridge inverter. When the a.c. line 12, 14 is energized, a d.c. voltage appears at the d.c. output terminals 32, 34. The switching control 90 provides control signals to the switching elements 38, 42, 46, 50 such that alternately the switching elements 38, 50 conduct while the switching elements 42, 46 are nonconducting and then the switching elements 42, 46 conduct and the switching elements 38, 50 are nonconducting. This repeats at the desired frequency. Thus, the d.c. voltage at the d.c. output terminals 32, 34 is applied alternately across the portion of the primary winding 64 between the end tap 62 and the intermediate tap 78 and the portion between the end tap 70 and the intermediate tap 74. This results in the desired a.c. voltage at the secondary winding 88 being produced.

The position of the intermediate taps 74, 78 determines the voltage at the center tap 80. The intermediate taps 74, 78 are positioned so that the voltage produced at the center tap 80 is, under normal a.c. line voltage conditions on the a.c. line 12, 14, a d.c. voltage somewhat higher than the voltage of the battery 86, for example, 10 percent greater.

As long as the voltage at the center tap 80 is higher than the voltage of the battery 86, the diode 84 blocks current flow from the center tap 80 to the battery 86. The changer circuit 82 allows a portion of the current from the center tap 80 to maintain the battery 86 in a charged state.

If the voltage on the a.c. line 12, 14 drops too far (or fails completely), the d.c. voltage at the d.c. output 32, 34 begins to drop. As this voltage drops, the voltage at the center tap 80 also drops. At some point, the center tap voltage drops below the voltage of the battery 86, and current is able to flow through the diode 84.

In this state, the switching elements 46, 50 are functioning as part of a center-tapped inverter circuit (also known as a parallel inverter). The voltage of the battery 86 is applied alternately across first the portion of the primary winding 64 between the center tap 80 and the intermediate tap 74 and then between the center tap 80 and the intermediate tap 78. This repeats at the desired frequency. This results in the desired a.c. voltage at the secondary winding 88.

This can perhaps best be visualized by imagining that the switching elements 38, 42 and the portions of the primary winding 64 outside of the intermediate taps 74, 78, are no longer present. The components are of course still present, but their only effect in this mode of operation is to keep the capacitor 30 charged.

The return of sufficient a.c. line voltage will boost the d.c. voltage at the terminals 32, 34; the voltage of the center tap 80 will increase to reverse bias the diode 84; the power supply 10 will resume functioning as an H-bridge inverter and the charger circuit 82 will recharge the battery 86.

It should be noted that the changeover from a high voltage H-bridge to a center-tapped inverter operating from a low voltage battery takes place quite naturally and automatically, with no change in the control signals from the switching control 90 required. No voltage sensing or switching of any kind is required.

Figure 2:
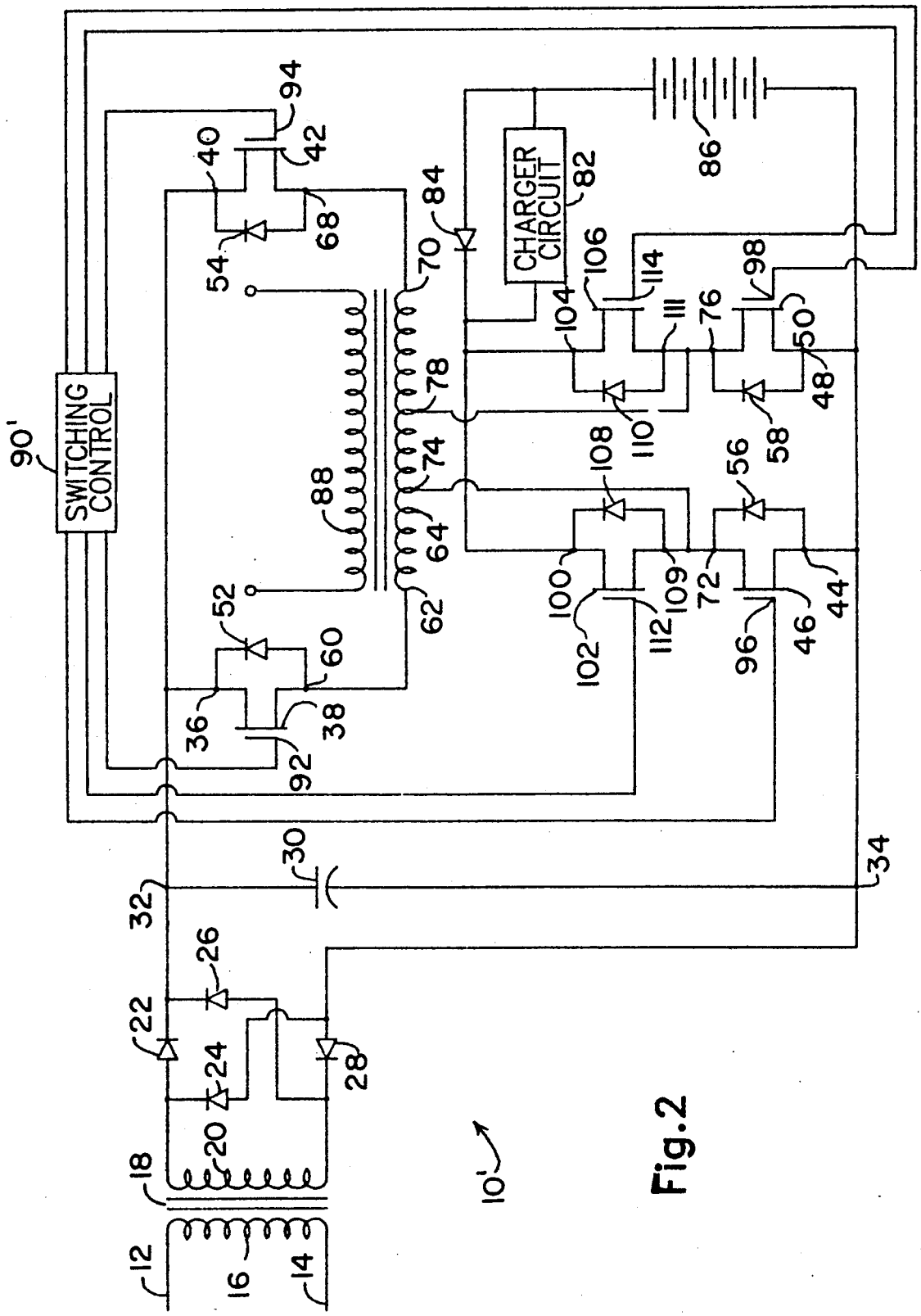
FIG. 2 is a schematic diagram of another embodiment of an uninterruptible power supply according to the invention.

Referring to FIG. 2, another embodiment of an uninterruptible power supply according to the invention is generally indicated by the numeral 10'.

Instead of the cathode of the diode 84 and the input of the charger circuit 82 being connected to a center tap of the primary winding 64 as shown in FIG. 1, they are connected to the terminal 100 of a switching element 102 and to the terminal 104 of a switching element 106. As with the switching elements 38, 42, 46, 50, the switching elements 102, 104 may be, for example, field-effect transistors as shown, or bipolar transistors, or SCRs. The diodes 108, 110 are connected in inverse parallel with the switching elements 102, 106 respectively. The terminal 109 of the switching element 102 is connected to the intermediate tap 74 and the terminal 111 of the switching element 106 is connected to the intermediate tap 78. In the case of field-effect transistors the diode is integral with the transistor. In other types of switching elements are used, a separate diode is used.

A switching control 90' provides switching control signals to the control inputs 92, 94, 96, 98, 112, 114 of switching elements 38, 42, 46, 50, 102, 106, respectively.

Normally, the power supply 10' operates as an H-bridge inverter. When the a.c. line 12, 14 is energized, a d.c. voltage appears at the d.c. output terminals 32, 34. The switching control 90' provides control signals to the switching elements 38, 42, 46, 50, 102, 106 such that alternately the switching elements 38, 50, 102 conduct while the switching elements 42, 46, 106 are nonconducting and then the switching elements 42, 46, 106 conduct and the switching elements 38, 50, 102 are nonconducting. This repeats at the desired frequency.

As a result, the d.c. voltage at the d.c. output terminals 32, 34 is applied alternately across the portion of the primary winding 64 between the end tap 62 and the intermediate tap 78 and the portion between the end tap 70 and the intermediate tap 74. This results in the desired a.c. voltage at the secondary winding 88 being produced.

At the same time, the switching of the switching elements 102, 106 provides a portion of these voltages to the diode 84 and the charger circuit 82. In particular, when the voltage from the terminals 32, 34 is applied across the portion of the primary winding 64 between the end tap 62 and the intermediate tap 78, the intermediate tap 74 is connected to the diode 84 and the charger circuit 82. Similarly, when the voltage from the terminals 32, 34 is applied across the portion of the primary winding 64 between the end tap 70 and the intermediate tap 74, the intermediate tap 78 is connected to the diode 84 and the charger circuit 82.

The position of the intermediate taps 74, 78 determines the voltage that the switching elements 102, 106 provide to the diode 84 and the charger circuit 82. The intermediate taps 74, 78 are positioned so that the voltage produced at the diode 84 is, under normal a.c. line voltage conditions on the a.c. line 12, 14, a d.c. voltage somewhat higher than the voltage of the battery 86, for example, 10 percent greater.

As long as the voltage at the cathode of the diode 84 is higher than the voltage of the battery 86, the diode 84 blocks current flow from the intermediate taps 74, 78 to the battery 86. The charger circuit 82 allows a portion of the current from the intermediate taps 74, 78 to maintain the battery 86 in a charged state.

If the voltage on the a.c. line 12, 14 drops too far (or fails completely), the d.c. voltage at the d.c. output 32, 34 begins to drop. As this voltage drops, the voltage at the cathode of the diode 84 also drops. At some point, this voltage drops below the voltage of the battery 86, and current is able to flow through the diode 84.

In this state, the switching elements 46, 50, 102, 106 are functioning as part of an H-bridge inverter circuit powered by the battery 86. The voltage of the battery 86 is applied alternatingly across the portion of the primary winding 64 between the intermediate tap 74 and the intermediate tap 78. This repeats at the desired frequency. This results in the desired a.c. voltage at the secondary winding 88.

The return of sufficient a.c. line voltage will boost the d.c. voltage at the terminals 32, 34; the voltage of the cathode of the diode 84 will increase to reverse bias the diode 84; the power supply 10 will resume functioning with power from the d.c. output terminals 32, 34 and the charger circuit 82 will recharge the battery 86.

The embodiment of FIG. 2 is useful where more intermediate battery voltages are used (e.g. 36–48 volts) because the voltage doubling effect of a center-tapped inverter is not present.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:
1. An inverter comprising:
   a transformer having a primary winding and a secondary winding, said primary winding being divided into at least three portions;
   a first d.c. source applied alternately across a first less than all portions of the primary winding and then across a second less than all portions of the primary winding, said first and second less than all portions having a common portion; and
   a second d.c. source applied alternatingly across at least a portion of said common portion when said first d.c. source is less than a predetermined voltage, whereby said secondary winding is maintained at a relatively constant a.c. voltage.

2. An inverter according to claim 1, wherein said second d.c. source is applied alternatingly across said at least a portion of said common portion in a center-tapped inverter configuration, said at least a portion of said common portion having a center tap.

3. An inverter according to claim 2, wherein said predetermined voltage is determined by when a voltage at said center tap drops below that of the second d.c. source.

4. An inverter according to claim 1, wherein said second d.c. source is applied alternatingly across said at least a portion of said common portion in an H-bridge inverter configuration, said at least a portion of said common portion having a voltage at each end thereof.

5. An inverter according to claim 4, wherein said predetermined voltage is determined by when both end voltages drop below that of the second d.c. source.

6. An uninterruptible power supply normally powered by an a.c. line, the power supply comprising:
   a transformer having a primary winding and a secondary winding, said primary winding having first and second end taps, a center tap and a tap intermediate to each end tap and said center tap;
   a d.c. source powered by the a.c. line, said source having a first and second terminal;
   a first switch means connected in series relationship with said first source terminal and said first end tap;
   a battery having a first and second terminal;
   a second switch means connected in series relationship with said intermediate tap farthest from said first end tap and with said first battery terminal;
   a third switch means connected in series relationship with said first source terminal and said second end tap;
   a fourth switch means connected in series relationship with said said intermediate tap farthest from said second end tap and with said first battery terminal;
   a unidirectional current device having a first and second terminal, said first unidirectional current device terminal being connected in series relationship with said second battery terminal and said second unidirectional current device terminal being connected in series relationship with said center tap; and
   means to alternately cause said first and second switch means to conduct while said third and fourth switch means are nonconducting and then to cause said third and fourth switch means to conduct while said first and second switch means are nonconducting, whereby said secondary winding is maintained at a relatively constant a.c. voltage as said source drops below a predetermined voltage.

7. An uninterruptible power supply normally powered by an a.c. line, the power supply comprising:
   a transformer having a primary winding and a secondary winding, said primary winding having first and second end taps and first and second intermediate taps;
   a d.c. source powered by the a.c. line, said source having a first and second terminal;

a first switch means connected in series relationship with said first source terminal and said first end tap;

a battery having a first and second terminal;

a second switch means connected in series relationship with said intermediate tap farthest from said first end tap and with said first battery terminal;

a third switch means connected in series relationship with said first source terminal and said second end tap;

a fourth switch means connected in series relationship with said intermediate tap farthest from said second end tap and with said first battery terminal;

a unidirectional current device having a first and second terminal, said first unidirectional current device terminal being connected in series relationship with said second battery terminal;

a fifth switch means connected in series relationship with said intermediate tap farthest from said first end tap and with said second unidirectional current device terminal;

a sixth switch means connected in series relationship with said intermediate tap farthest from said second end tap and with said second unidirectional current device terminals; and means to alternately cause said first, second, and fifth switch means to conduct while said third, fourth, and sixth switch means are nonconducting and then to cause said third, fourth, and sixth switch means to conduct while said first, second, and fifth switch means are nonconducting, whereby said secondary winding is maintained at a relatively constant a.c. voltage as said source drops below a predetermined voltage.

* * * * *

UNITED STATES PATENT AND TRADEMARK OFFICE
CERTIFICATE OF CORRECTION

PATENT NO. : 5,010,469

DATED : April 23, 1991

INVENTOR(S) : Howard H. Bobry

It is certified that error appears in the above-identified patent and that said Letters Patent is hereby corrected as shown below:

Claim 7, Column 8, Line 8, "terminals" should be "terminal".

Signed and Sealed this

Tenth Day of November, 1992

Attest:

DOUGLAS B. COMER

*Attesting Officer*  *Acting Commissioner of Patents and Trademarks*